United States Patent
Choo et al.

(10) Patent No.: US 7,058,675 B1
(45) Date of Patent: Jun. 6, 2006

(54) APPARATUS AND METHOD FOR IMPLEMENTING EFFICIENT ARITHMETIC CIRCUITS IN PROGRAMMABLE LOGIC DEVICES

(75) Inventors: Chang Choo, San Jose, CA (US); Asher Hazanchuk, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 730 days.

(21) Appl. No.: 09/863,650

(22) Filed: May 22, 2001

Related U.S. Application Data (60) Provisional application No. 60/236,244, filed on Sep. 28, 2000.

(51) Int. Cl.
 *G06F 1/02* (2006.01)
 *G06F 7/52* (2006.01)
(52) U.S. Cl. ...................................... 708/272; 708/654
(58) Field of Classification Search ................ 708/502, 708/654, 272

See application file for complete search history.

(56) References Cited

U.S. PATENT DOCUMENTS

| | | | | |
|---|---|---|---|---|
| 4,991,132 A | * | 2/1991 | Kadota ....................... | 708/654 |
| 5,153,851 A | * | 10/1992 | Kanazawa et al. .......... | 708/654 |
| 5,768,171 A | * | 6/1998 | Chow ......................... | 708/654 |
| 6,260,054 B1 | * | 7/2001 | Rosman et al. ............. | 708/502 |

* cited by examiner

*Primary Examiner*—Chuong D Ngo
(74) *Attorney, Agent, or Firm*—Morgan, Lewis & Bockius LLP (57) ABSTRACT

Efficient implementation of arithmetic circuits in programmable logic devices by using Look-Up Tables (LUTs) to store pre-calculated values. A table look-up operation is performed in place of complex arithmetic operations. In this way, at the expense of a few LUTs, many logic elements can be saved. This approach is particularly applicable to circuits for calculating reciprocal values and circuits for performing normalized LMS algorithm.

18 Claims, 6 Drawing Sheets

APPARATUS AND METHOD FOR IMPLEMENTING EFFICIENT ARITHMETIC CIRCUITS IN PROGRAMMABLE LOGIC DEVICES

This application claims priority to the provisional patent application entitled, "Apparatus and Method for Implementing Complex Arithmetic Circuits in Programmable Logic Devices," Ser. No. 60/236,244, filed Sep. 28, 2000.

BRIEF DESCRIPTION OF THE INVENTION

The present invention relates generally to programmable logic devices (PLDs). More specifically, the present invention relates to techniques for efficiently implementing complex circuits in PLDs.

BACKGROUND OF THE INVENTION

Many applications in digital signal processing require the use of complicated circuits for performing complex arithmetic calculations in real time. For example, in order to cancel echoes that occur as a result of hybrid coupling within a telephone network, adaptive Finite Impulse Response (FIR) filters have been used. Such FIR filters typically include complicated arithmetic circuits for performing reciprocal calculations, and complicated µ-Law/A-Law expander circuits for expanding µ-Law/A-Law encoded signals.

PLDs are the devices of choice in implementing these complicated digital signal processors. For many PLDs, the basic building blocks are the Logic Elements (LEs) or Logic Array Blocks (LABs) that include logic circuits that may be programmed to perform specific logic operations. Due to their complexity, digital signal processors typically require the use of many LEs. Each PLD has a limited number of LEs. Therefore, after these arithmetic circuits are implemented, few LEs are left for performing other functions. As a result, it is often difficult to implement an entire digital signal processing system with complicated arithmetic circuits on a single PLD.

Accordingly, it would be desirable to provide improved techniques for efficiently implementing complex arithmetic circuits in programmable logic devices.

SUMMARY OF THE DISCLOSURE

Techniques for efficient implementation of complex arithmetic circuits in programmable logic devices are disclosed. In one aspect of the present invention, Look-Up Tables (LUTs) of a programmable logic device are used to store pre-calculated intermediate or final calculation values. A table look-up operation is performed in place of complex arithmetic operations. In this way, at the expense of a few LUTs, many logic elements can be saved. This approach is particularly applicable to circuits for calculating reciprocal values and circuits for performing a normalized Least-Mean-Squared (LMS) algorithm.

According to one aspect of the invention, a circuit for calculating reciprocal values is implemented with LUT(s) having stored therein pre-calculated reciprocal values. The pre-calculated reciprocal values are determined based on the address locations at which they are stored. In operation, an input value to the circuit is partitioned into a number of segments. Then, one of the segment is selected for indexing the LUT(s) and for retrieving an associated pre-calculated reciprocal value therefrom. The retrieved pre-calculated reciprocal value is then shifted, according to a position of the selected segment within the input value, to obtain an output value. In one embodiment of the invention, the selected segment is the first segment, starting from the decimal point, that contains at least one digital "high" value (e.g., a logic "1"). Further, according to the present invention, the input value is a fraction, and the output of the circuit, which is an approximate reciprocal of the input value, is an integer.

In another aspect of the present invention, a circuit implementing a normalized LMS algorithm has LUTs storing pre-calculated µ-Law or A-law expansion values. An input to the circuit, which is either µ-Law or A-Law encoded, is provided to the LUT as an index for retrieving an associated expansion value. The retrieved expansion value is then provided to circuits for performing other steps of the normalized LMS algorithm. Accordingly, by using LUTs to store pre-calculated µ-Law or A-Law expansion values, such complicated arithmetic circuits can be implemented with a significantly smaller number of LEs.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures, devices, methodologies, etc., are not described in detail in order to avoid obscuring aspects of the present invention.

A. General Description of a Programmable Logic Device

Figure 1:
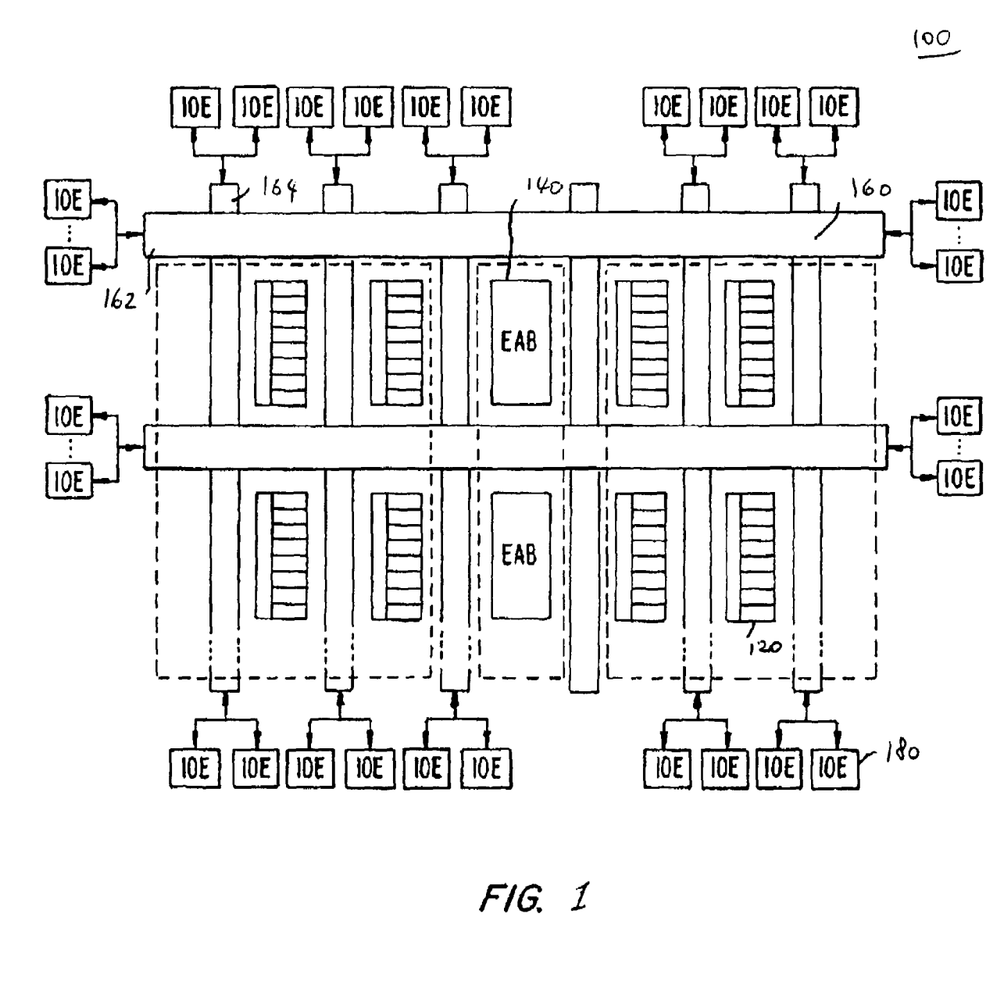
FIG. 1 is a block diagram illustrating a programmable logic device on which embodiments of the present invention may be practiced.

FIG. 1 is a block diagram illustrating a programmable logic device 100 (e.g., Altera FLEX™ 10K device). The device 100 includes logic arrays blocks 120, embedded array blocks 140, an interconnect grid 160, and input/output elements 180. Interconnect grid 160 includes sets of horizontal conductors 162 and sets of vertical conductors 164 that are configured in a grid pattern. Logic array blocks 120 and embedded array blocks 140 are programmably connectable to horizontal conductors 162 and vertical conductors 164 of interconnect grid 160. Interconnect grid 160 is also programmably connectable to input/output elements 180. By programming a connection between input/output elements 180, logic array blocks 120 and embedded array blocks 140 through horizontal conductors 162 and vertical conductors 164, the user may create desired logical functions. Particularly, PLD 100 may be programmed to implement complex arithmetic circuits of the present invention.

B. Implementation of Arithmetic Circuits using Look-Up Tables

According to the present invention, complicated arithmetic circuits may be efficiently implemented within a programmable logic device (e.g., device 100) by using Look-Up Tables (LUTs) to store pre-calculated values. A table look-up operation can then be performed in place of complex arithmetic operations. In this way, at the expense of a few LUTs, many logic elements can be saved.

Figure 5:
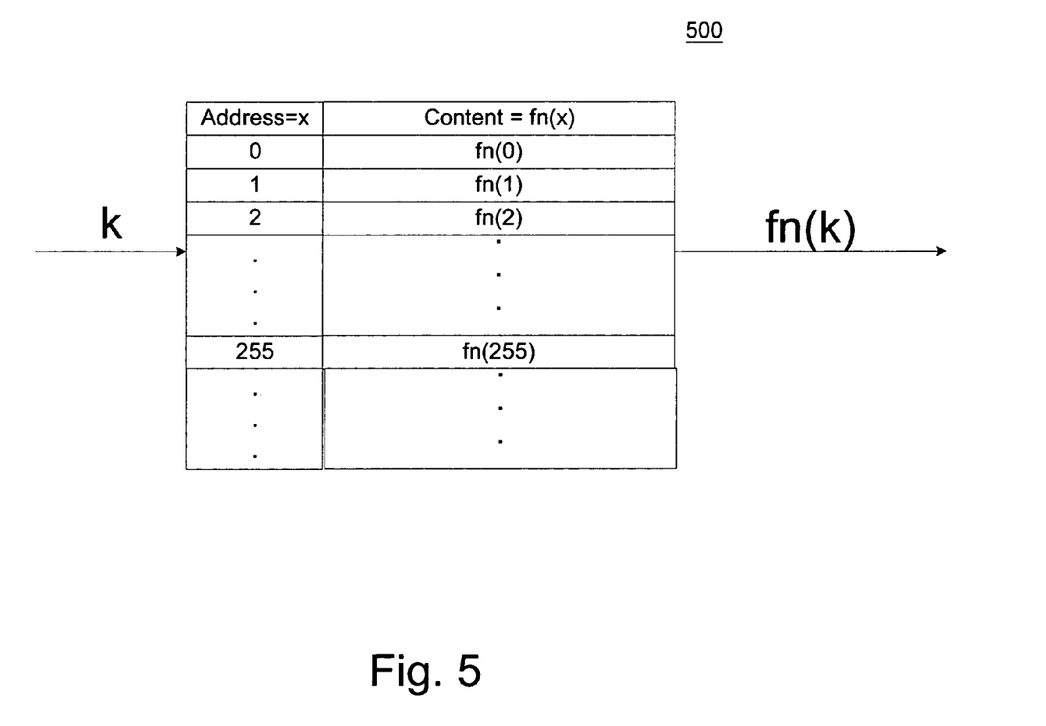
FIG. 5 is a block diagram illustrating a Look-Up Table (LUT) in accordance with an embodiment of the present invention.

As an example, it is desired to implement a circuit for calculating a complicated arithmetic function fn(x) in response to an input value x. Generally, complicated logic circuits requiring a large number of logic elements are used. However, according to an embodiment of the present invention, values of the function fn(x) over a range of input values (x) are first determined. The pre-determined or pre-calculated values are then stored within a LUT of a programmable logic device. In one embodiment, the pre-determined values are stored at addresses corresponding to the input values (x). For example, the pre-determined value of fn(1) is stored at address 1, and the predetermined value of fn(255) is stored at address 255. The LUT can then be used for calculating the value of fn(x) for an input value (x). For example, when an input value k is presented to the look-up table, the value stored at address k, which is fn(k), will then be provided as an output. A block diagram of a LUT 500 and its contents according to this embodiment of the present invention is illustrated in FIG. 5. The circuit for matching the input value to the appropriate address of the LUT 500 is well known in the art, and is not illustrated for purposes of clarity.

The present invention is particularly applicable to the implementation of complicated arithmetic circuits for adaptive digital voice filtering in programmable logic devices. In the following, exemplary implementations of circuits for carrying out normalized LMS (Least-Mean-Squared) algorithms are presented. It should be appreciated that, however, the present invention is not limited to such circuit implementations.

C. Implementation of a Reciprocal Circuit in a Programmable Logic Device

In various digital signal processing applications, efficient calculations of reciprocal values are often required. A brief description of a fast LUT-based algorithm for computing a reciprocal value given a fraction with arbitrary bit width follows.

Suppose $P_n = .(a_{n-1}\ a_{n-2}\ a_{n-3}\ \ldots\ a_1\ a_0)$ is an n-bit binary unsigned fraction. The decimal value of $P_n$ can be expressed as follows:

$$P_n = a_{n-1}*2^{-1} + a_{n-2}*2^{-2} + a_{n-3}*2^{-3} \ldots + a_0*2^{-n}$$

$$= (a_{n-1}*2^{-1} + a_{n-2}*2^{-2} + a_{n-3}*2^{-3} + \ldots + a_{n-L}*2^{-L}) +$$

$$2^{-L}(a_{n-(L+1)}*2^{-1} + a_{n-(L+2)}*2^{-2} + a_{n-(L+3)}*2^{-3} + \ldots + a_{n-2L}*2^{-L}) +$$

$$2^{-2L}(a_{n-(2L+1)}*2^{-1} + a_{n-(2L+2)}*2^{-2} + a_{n-(L+3)}*2^{-3} + \ldots + a_{n-3L}*2^{-L}) + \ldots$$

$$2^{-mL}(a_{n-(mL+1)}*2^{-1} + a_{n-(mL+2)}*2^{-2} + a_{n-(mL+3)}*2^{-3} + \ldots + a_0*2^{-L}).$$

A certain symmetry can be seen from the above expression. This symmetry of the expression can be exploited. Particularly, all possible reciprocal values of $(a_{n-1}*2^{-1} + a_{n-2}*2^{-2} + a_{n-3}*2^{-3} + \ldots + a_{n-L}*2^{-L})$ can be pre-calculated and stored within a look-up table, using the coefficients $(a_{n-(L+1)}\ a_{n-(L+2)}\ a_{n-(L+3)}\ \ldots\ a_{n-2L})$ as addresses. The reciprocal value of $2^{-L}(a_{n-(L+1)}*2^{-1} + a_{n-(L+2)}*2^{-2} + a_{n-(L+3)}*2^{-3} + \ldots + a_{n-2L}*2^{-L})$ can be determined by retrieving the pre-calculated reciprocal value from the look-up table using the coefficients $(a_{n-(L+1)}a_{n-(L+2)}a_{n-(L+3)} \ldots a_{n-2L})$ as the address, and by multiplying the retrieved value by $2^L$. Similarly, the reciprocal value of $2^{-mL}(a_{n-(mL+1)}*2^{-1} + a_{n-(mL+2)}*2^{-2} + a_{n-(mL+3)}*2^{-3} + \ldots + a_0*2^{-L})$ can be determined by retrieving the pre-calculated reciprocal value from the look-up table using the coefficients $(a_{n-(mL+1)}a_{n-(mL+2)}a_{n-(mL+3)} \ldots a_0)$ as the address, and by multiplying the retrieved value by $2^{mL}$.

As an example, suppose the fraction $P_n$ is divided into m equally wide fields each having 4 bits. To calculate the reciprocal of $P_n$, m look-up tables each having 4-bit wide addresses (or indices) and each capable of storing sixteen reciprocal values can be used.

The contents of one such look-up table are illustrated below in Table 1.

TABLE 1

| Address | Content |
|---------|---------|
| 0000 | 0 |
| 0001 | 16 |
| 0010 | 8 |
| 0011 | 16/3 |
| 0100 | 4 |
| 0101 | 16/5 |
| 0110 | 8/3 |
| 0111 | 16/7 |
| 1000 | 2 |
| 1001 | 16/9 |
| 1010 | 8/5 |
| 1011 | 16/11 |
| 1100 | 4/3 |
| 1101 | 16/13 |
| 1110 | 8/7 |
| 1111 | 16/15 |

In operation, for a fraction 0.1011 (bin), its reciprocal value can be determined by looking up Table 1 to retrieve the value stored at address 1011, which is $^{16}\!/_{11}$, or approximately 1.23. For a fraction 0.00001001 (bin), its reciprocal value can be calculated by looking up Table 1 to retrieve the value stored at address 1001, which is $^{16}\!/_{9}$, and multiplying $2^4$ to the retrieved value. In the present example, the reciprocal value of 0.00001001 (bin) can be easily determined to be $2^{40}*^{16}\!/_{9}$, or approximately 28.44.

Reciprocal calculation can be sped up even further by storing the reciprocal values in the look-up table as binary integer values. Multiplication of binary integer values by $2^n$ is equivalent to shifting the values to the left by n bits. Naturally, accuracy of the reciprocal calculation may be somewhat compromised. Nevertheless, in some applications where speed or simplicity is desired, such a trade-off may be preferred.

Note that the least significant segment may include fewer than L-bits (e.g., n−1 mod L bits). In that case, the look-up table with fewer entries will be used. It should also be noted that the present invention may also be applied to signed values. In that embodiment, the magnitude of a signed value is first determined. Then, the reciprocal of the magnitude is determined using techniques discussed above. Thereafter, if the original number is negative, the reciprocal value is two-complemented.

Figure 2A:
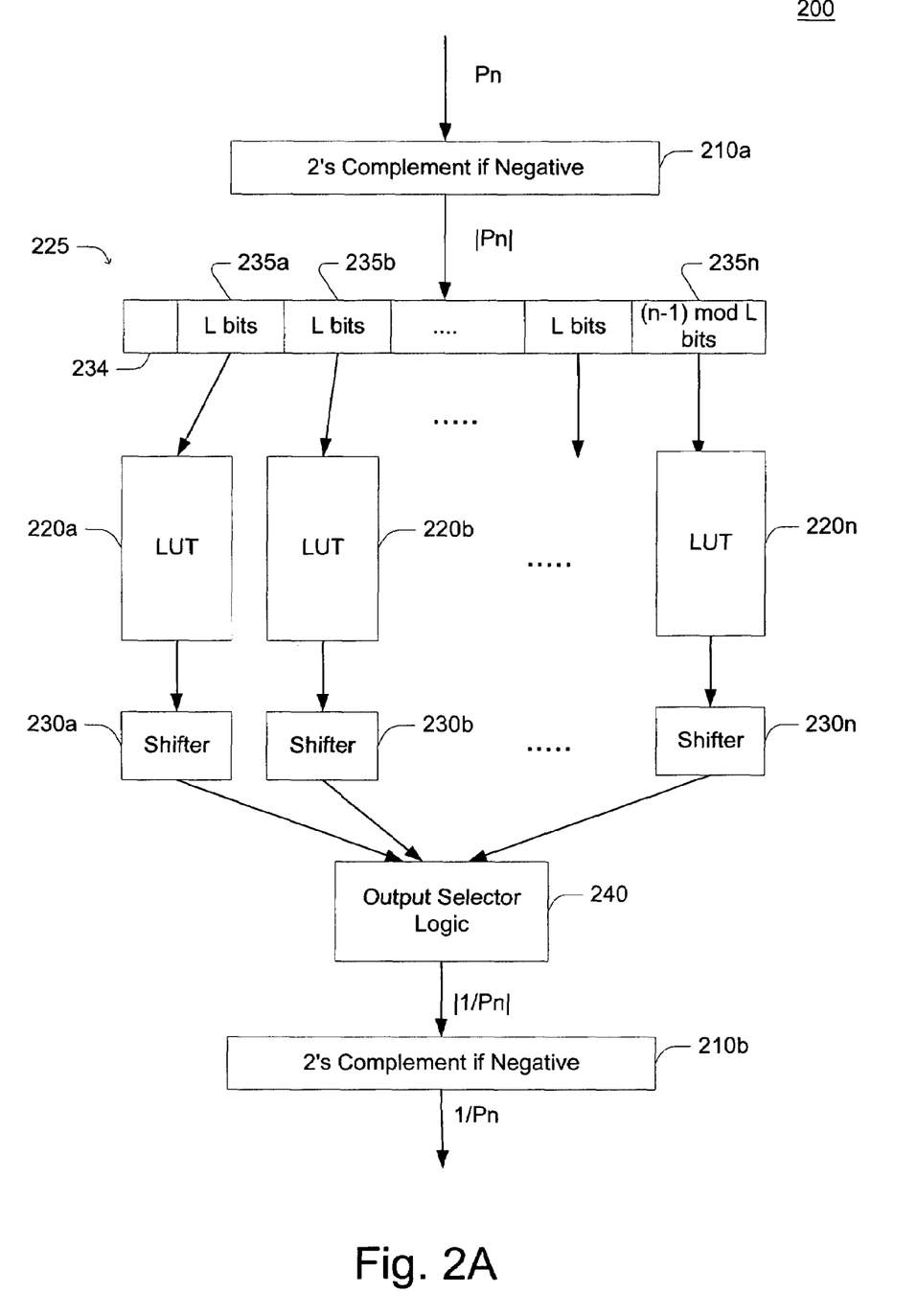
FIG. 2A is a block diagram illustrating a circuit for calculating reciprocal values in accordance with one embodiment of the present invention.

FIG. 2A is a block diagram illustrating a circuit 200 for calculating reciprocal values in accordance with one embodiment of the present invention. Circuit 200, according to the present invention, may be implemented using a programmable logic device (e.g., device 100). As illustrated, circuit 200 includes 2's complement circuits 210*a*–210*b*, a plurality of identical look up tables 220*a*–220*n*, a plurality of shifters 230*a*–230*n*, and an output selector circuit 240.

In operation, when a number $P_n$ is received, the 2's complement circuit 210*a* determines whether the number is negative and determines the magnitude $|P_n|$ of the number. The magnitude $|P_n|$ is then partitioned into m segments each being L-bit in width. The partitioned magnitude $|P_n|$ 225, containing a plurality of segments 235*a*–235*n*, is also illustrated in FIG. 2A. The most significant bit of the partitioned magnitude $|P_n|$ is the sign bit 234, which is not taken into account when the number is partitioned. Note that the least significant segment 235*n* may contain only (n−1 mod L) bits.

The segments 235*a*–235*n* are then provided to look-up tables 220*a*–220*n*. According to the present embodiment, each LUT 220*a*–220*n* has stored therein a plurality of pre-determined reciprocal values. In the embodiment illustrated in FIG. 2A, the contents of the LUTs 220*a*–220*n* may be identical. Further, the reciprocal values are pre-calculated based on the addresses of the LUT at which the reciprocal values are stored. For example, address 1011 stores the reciprocal value of 0.1011, and address 1110 stores the reciprocal value of 0.1110, etc. Thus, when a segment 235*a* of the magnitude $|P_n|$ is presented to the LUT 220*a*, the LUT 220*a* retrieves the reciprocal value stored at the address corresponding to the segment 235*a* and provides the retrieved reicprocal value to the shifter 230*a*. Likewise, when a segment 235*b* is presented to the LUT 220*b*, the reciprocal value stored at the address corresponding to the segment 235*b* will be retrieved and provided to the shifter 230*b*. It should be noted, however, that address 0000 does not store the reciprocal value of 0.0000. Rather, address 0000 of the look-up table stores a value of zero, or a value that indicates a potential error.

Each of the shifters 230*a*–230*n* shifts the retrieved reciprocal values according to the position of the segment within $|P_n|$. For example, the shifter 230*b* is configured to shift the reciprocal value L bits to the left, and the shifter 230*n* is configured to shift the reciprocal value (n−1)*L bits to the left.

The shifted values are then provided to the output selector circuit 240. In accordance with the present embodiment, the output selector circuit 240 selects a first non-zero output from the shifters 230*a*–230*n* and ignores the rest of their outputs. In this embodiment, the shifter 230*a*, corresponding to the most significant bits of the input value, has the highest priority, and the shifter 230*b*, corresponding to the next most significant bits of the input value, has the second highest priority, etc. For example, if the output of shifter 230*a* is non-zero, then the outputs of the shifters 230*b*–230*n* are ignored. As another example, if the output of shifter 230*a* is zero (indicating that the first segment 225*a* contains 0000), but the output of the shifter 230*b* is non-zero, then the selective adder 240 selects the output of the shifter 230*b*. The selected output is then provided to 2's complement circuit 210*b* to be converted into 2's complement form if the original number is negative.

Figure 2B:
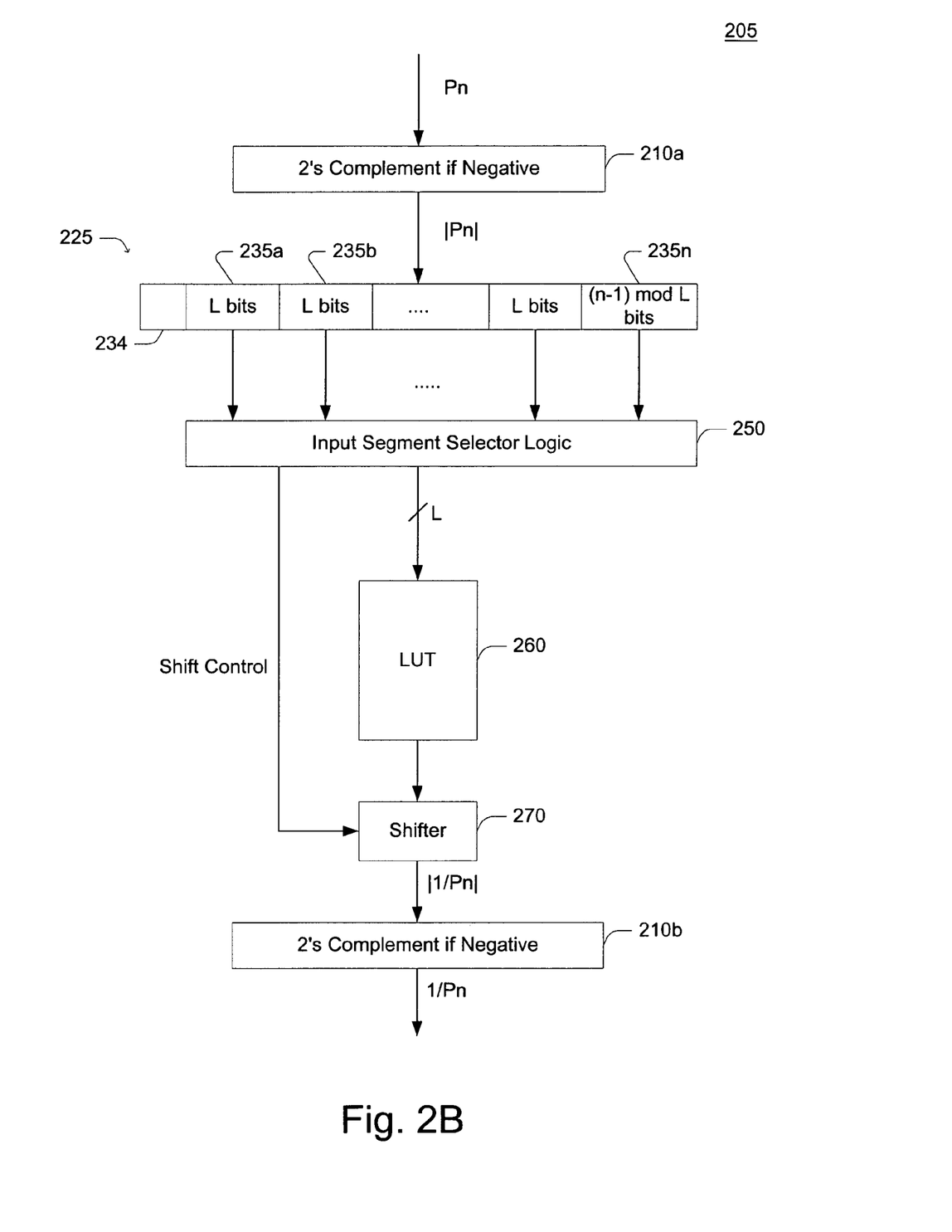
FIG. 2B is a block diagram illustrating a circuit for calculating reciprocal values in accordance with another embodiment of the present invention.

In another embodiment of the present invention, instead of using multiple LUTs in parallel, a single LUT may be used to determine the reciprocal values. FIG. 2B illustrates a circuit 205 for calculating reciprocal values in accordance with another embodiment of the present invention. Like circuit 200, circuit 205 is suitable for implementation by a PLD.

As shown, circuit 205 includes 2's complement circuits 210*a*–210*b*, an input segment selector circuit 250, a look-up table 260, and a shifter 270. The LUT 260 has stored therein a plurality of pre-determined reciprocal values that are pre-calculated based on the addresses of the LUT at which the reciprocal values are stored. For example, address 1011 stores the reciprocal value of 0.1011, and address 1110 stores the reciprocal value of 0.1110, etc.

In operation, when a number $|P_n|$ is received, the 2's complement circuit 210*a* determines whether the number is negative and determines the magnitude $|P_n|$ of the number. The magnitude $|P_n|$ is then partitioned into m segments each being L-bit in width. The partitioned magnitude $|P_n|$ 225, containing a plurality of segments 235*a*–235*n*, is also illustrated in FIG. 2A. The most significant bit of the partitioned magnitude $|P_n|$ is the sign bit 234, which is not taken into account when the number is partitioned. Note that the least significant segment 235*n* may contain only (n−1 mod L) bits.

The segments 235*a*–235*n* are then provided to the input segment selector circuit 250. The input segment selector circuit 250 selects the first non-zero segment of the magnitude $|P_n|$ 225 (e.g., the non-zero segment that is closest to the sign bit 234) to be provided to the LUT 260. In response, the LUT 260 retrieves the reciprocal value stored at the address corresponding to the first non-zero segment and provides the retrieved value to the shifter circuit 270. The shifter 270 then shifts the retrieved reciprocal value according to a shift control signal provided by the input segment selector circuit 250. The output of the shifter 270 is then provided to 2's complement circuit 210*b* to be converted into 2's complement form if the original number is negative.

Figure 3:
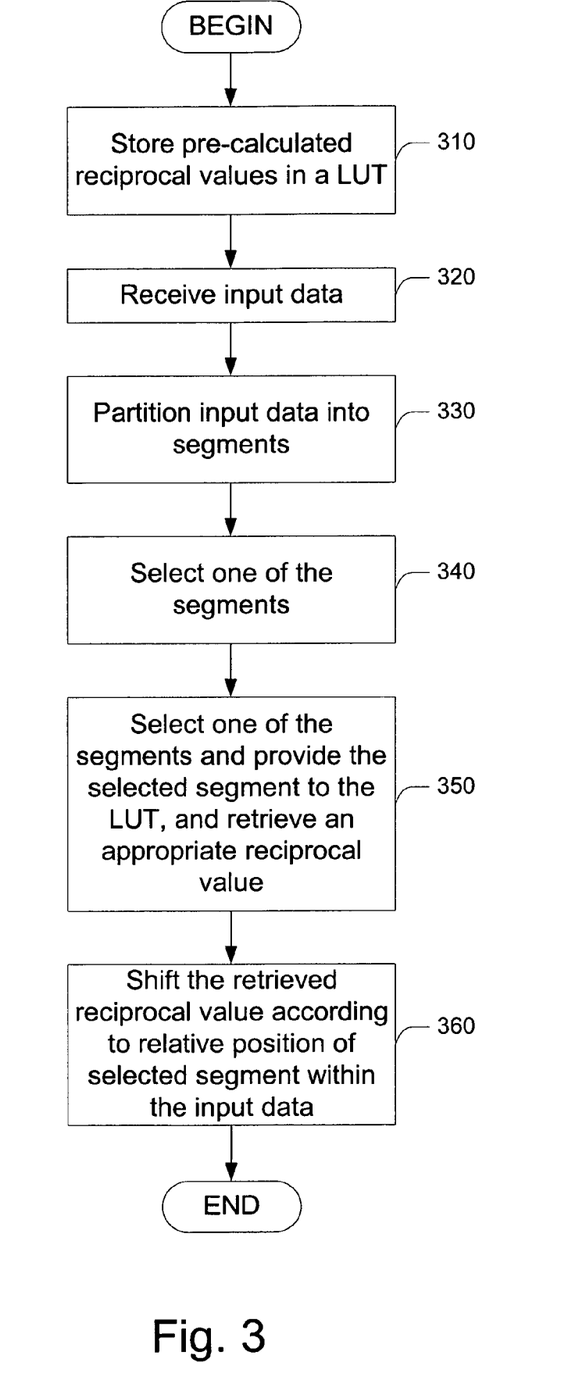
FIG. 3 is a flow chart diagram illustrating a method of calculating reciprocal values using an LUT-based reciprocal calculation circuit in accordance with an embodiment of the present invention.

FIG. 3 is a flow diagram illustrating a method of determining reciprocal values for an input data using a LUT-based reciprocal calculation circuit (e.g., circuit 205) in accordance with one embodiment of the present invention. As shown in FIG. 3, at step 310, reciprocal values are stored in a look-up table. According to an embodiment of the invention, the reciprocal values may be stored at addresses of the look-up table that correspond to the reciprocal values. For instance, the reciprocal value of 0.0010 may be stored at address 0010 of the LUT. It should be noted that, in that embodiment, an ERROR value or a zero value may be stored at address 0000 of the LUT.

At step 320, an input data is received. Then, at step 330, the input data is partitioned into a number of segments each having a bit-width corresponding to the bit-width of the addresses of the look-up table. For instance, if the look-up table has 8-bit wide addresses and the input data is 32-bit wide, the input data is partitioned into four 8-bit wide segments.

At step 340, one of the segments is selected and provided to the look-up table to determine if there is a match and to retrieve a reciprocal value whose address matches the selected segment. According to the present embodiment, the first segment containing a non-zero value may be selected. Note that other selection criteria may also be used.

Then, at step 350, the retrieved reciprocal value is shifted according to a position of the selected segment in relation to the input data to generate an approximate reciprocal value for the input data. For instance, if the second 8-bit segment of a 32-bit input fraction is selected, then the retrieved reciprocal value is shifted eight bits to the left. If the third 8-bit segment of the 32-bit input fraction is selected, then the retrieved reciprocal value is shifted sixteen bits to the left. The result of the shifting will be an approximate value of the reciprocal of the 32-bit input fraction.

D. Implementation of a μ-Law/A-Law Expander Circuit

The normalized LMS algorithm is a well-known algorithm in the field of telecommunications. Specifically, the normalized LMS algorithm can be used for canceling echoes that occur as a result of hybrid coupling within a telephone network. Generally, the normalized LMS algorithm can be represented by the following equations:

$$P(j) = (1-a)*P(j-1) + a*x(j)*x(j)$$

$$h_i(j+1) = h_i(j) + (\mu \cdot e(j)/P(j)) \cdot x(j-1), \text{ where}$$

$$i = 0, ..., N-1.$$

For μ-Law encoded data Rin(j), the linear input data x(j) can be represented by the expression: μ-Law(Rin(j)), where Rin(j) is the μ-Law 8-bit compressed value of the input data x(j). For A-Law encoded data Rin(j), the linear input data x(j) can be represented by the expression: A-Law(Rin(j)), where Rin(j) is the A-Law 8-bit compressed value of the input data x(j).

Due to its complexity, the normalized LMS algorithm, if implemented as a circuit within a programmable logic device, would require more than six hundred logic elements. Logic elements, however, are critical resources in a programmable logic device. Thus, it is desirable to implement a circuit for performing LMS algorithms that do not require as many logic elements. The present invention presents a new approach that is significantly more efficient than prior art approaches.

As shown above, the first step in the normalized LMS algorithm is to square the far end linear input data x(j) for calculation of the input signal power P(j). According to the present invention, instead of first calculating the linear value of x(j)=μ-Law(Rin(j)) or A-Law(Rin(j)), and then calculating the value of x(j)*x(j), pre-calculated values for [μ-Law(Rin(j))* μ-Law(Rin(j))] or [A-Law(Rin(j))*A-Law(Rin(j))] are stored in a single look-up table. In particular, the pre-calculated values are stored in the look-up table using the values (Rin(j)) as storage addresses. For example, pre-calculated value for [μ-Law(255) *μ-Law(255)] may be stored at address 255 of the look-up table. Then, during the LMS calculation, the input value Rin(j) is then used as an index to look-up the corresponding [μ-Law(Rin(j))* μ-Law (Rin(j))] or [A-Law(Rin(j))*A-Law(Rin(j))] value. In this way, a significant number of logic elements can be saved at the expense of only one embedded array block, which is used for implementing the look-up table.

Figure 4A:
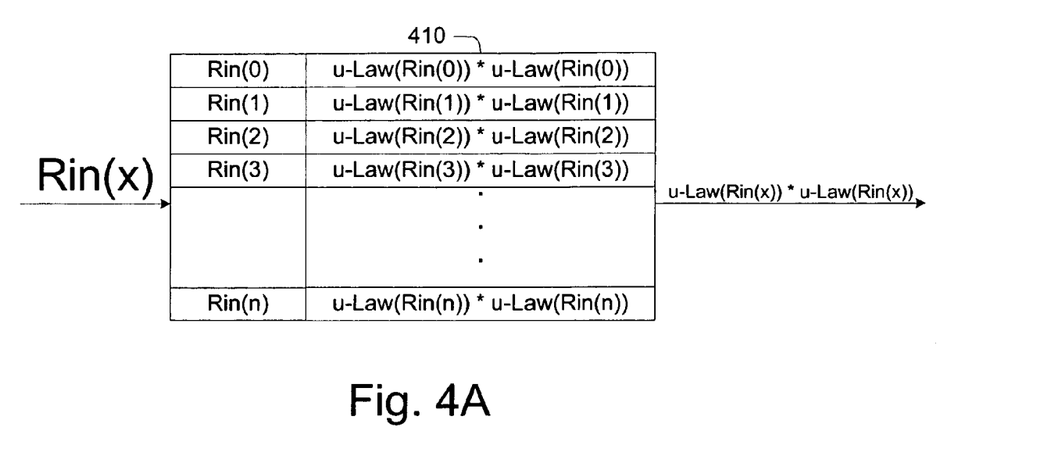
FIG. 4A is a block diagram illustrating a Look-Up Table (LUT) for implementing a µ-Law expander in accordance with one embodiment of the present invention.

FIG. 4A is a block diagram illustrating a look-up table 410 for implementing a μ-Law expander in accordance with one embodiment of the present invention. As shown, the look-up table 410 includes pre-calculated values of [11-Law(Rin(j)) *μ-Law(Rin(j))] for all possible input values Rin(j). It should be noted that Rin(j) is an 8-bit value. Thus, in the present embodiment, 256 pre-calculated A-Law expansion values are stored within the look-up table 410.

Figure 4B:
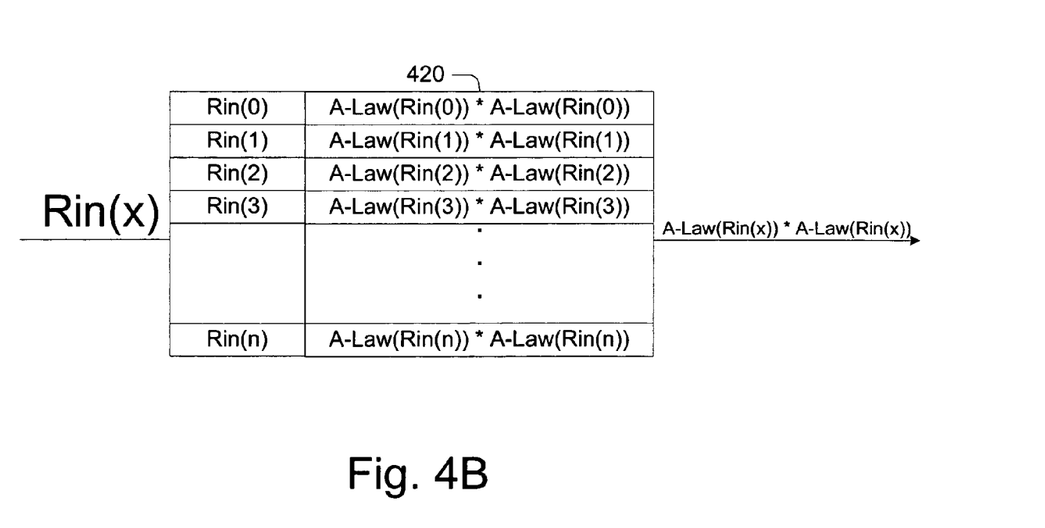
FIG. 4B is a block diagram illustrating a Look-Up Table (LUT) for implementing an A-law expander in accordance with one embodiment of the present invention.

FIG. 4B is a block diagram illustrating another look-up table 420 for implementing an A-law expander in accordance with one embodiment of the present invention. The look-up table 420 includes pre-calculated values of [A-Law (Rin(j))*A-Law(Rin(j))] for all possible input values Rin(j). Similar to table 410, the table 420 includes 256 pre-calculated A-Law expansion values.

The present invention, the use of embedded memory for efficient implementation of complex arithmetic circuits, has thus been disclosed. The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A circuit for calculating reciprocal values, comprising:
   an input for receiving input data, the input data being partitionable into a plurality of segments;
   a selector circuit for selecting one of the segments;
   a look-up table coupled to the selector circuit for receiving the selected segment, the look-up table having stored therein pre-calculated values, the look-up table configured to provide a respective one of the pre-calculated values in response to the selected segment; and
   a shifter circuit coupled to the look-up table, the shifter circuit configured to shift the respective one of the pre-calculated values according to a relative position of the selected segment within the input data to generate an approximate reciprocal value for the input data.

2. The circuit of claim 1, wherein the selector circuit is configured to select a non-zero segment of the input data to be provided to the look-up table.

3. The circuit of claim 1 further comprising a first 2's complement circuit for converting a negative input data into the input data.

4. The circuit of claim 3 further comprising a second 2's complement circuit for converting the approximate reciprocal value into a negative approximate reciprocal value.

5. A method of calculating reciprocal values in a processing circuit, comprising:
   storing in a memory unit a plurality of reciprocal values in a look-up table in association with a plurality of possible input values, wherein the plurality of input values comprise addresses of the memory unit;
   receiving an input value, the input value having a larger bit-width than each of the possible input values;
   partitioning the input value into a plurality of segments each having a bit-width corresponding to each of the possible input values;
   selecting one of the segments and providing the selected one of the segments to the look-up table to retrieve a respective one of the reciprocal values; and
   shifting the respective one of the reciprocal values according to a position of the selected one of the segments in relation to the input value to generate an approximate reciprocal value for the input data.

6. The method of claim 5, wherein the storing comprises:
   storing the plurality of possible input values as indices of the look up table.

7. The method of claim 5, wherein the memory unit is the memory unit of a programmable logic device.

8. In a programmable logic device, a circuit for determining a mathematical function for an input value, the circuit comprising:
   an input for receiving the input value;
   a partitioning circuit for partitioning the input value into a plurality of segments;
   a look-up table coupled to the input for receiving the input value, the look-up table comprising a plurality of storage addresses and a plurality of pre-determined values stored in association with the storage addresses, wherein the pre-determined values are determined according to the mathematical function and the storage addresses at which the pre-determined values are stored;
   a matching circuit for matching a selected segment of the input value to a respective one of the storage addresses;
   a shifter circuit configured to shift the pre-determined values retrieved from the look-up table according to a relative position of the segment of the input valve that is matched to a storage address; and
   an output for outputting the pre-determined values from the shifter circuit.

9. The circuit of claim 8, wherein the addresses range from 0 to 255.

10. The circuit of claim 9, wherein the look-up table stores 256 pre-determined values for each of the storage addresses.

11. The circuit of claim 8, wherein the programmable logic device is a field programmable gate array (FPGA).

12. A method of calculating reciprocal values in a processing circuit, comprising:
   storing a plurality of reciprocal values in a look-up table in a memory unit in association with a plurality of possible input values;
   receiving an input value, the input value having a larger bit-width than each of the possible input values;
   partitioning the input value into a plurality of segments each having a bit-width corresponding to each of the possible input values;
   selecting one of the segments and providing the selected one of the segments as an address to the look-up table in the memory unit to retrieve a respective one of the reciprocal values; and
   shifting the respective one of the reciprocal values according to a position of the selected one of the segments in relation to the input value to generate an approximate reciprocal value for the input data.

13. Apparatus for calculating reciprocal values, comprising:
   means for storing a plurality of reciprocal values in a look-up table in a memory unit in association with a plurality of possible input values;
   means for receiving an input value, the input value having a larger bit-width than each of the possible input values;
   means for partitioning the input value into a plurality of segments each having a bit-width corresponding to each of the possible input values;
   means for selecting one of the segments and providing the selected one of the segments to the look-up table to retrieve a respective one of the reciprocal values; and
   means for shifting the respective one of the reciprocal values according to a position of the selected one of the segments in relation to the input value to generate an approximate reciprocal value for the input data.

14. The apparatus of claim 13, wherein the plurality of possible input values are indices of the look up table.

15. A circuit for determining a mathematical function for an input value, the circuit comprising:
   an input for receiving the input value;
   a partitioning circuit for partitioning the input value into a plurality of segments;
   a look-up table coupled to the input for receiving the input value, the look-up table comprising a plurality of storage addresses and a plurality of pre-determined values stored in association with the storage addresses, wherein the pre-determined values are determined according to the mathematical function and the storage addresses at which the pre-determined values are stored;
   a matching circuit for matching a selected segment of the input value to a respective one of the storage addresses; and
   a shifter circuit coupled to the look-up table, the shifter circuit configured to shift respective ones of the pre-determined values retrieved from the look-up table according to a relative position of the segment of the input value that is matched to a storage address.

16. The circuit of claim 15, wherein the addresses range from 0 to 255.

17. The circuit of claim 15, wherein the look-up table stores 256 pre-determined values for each of the storage addresses.

18. The circuit of claim 15, wherein the circuit is implemented in a field programmable gate array (FPGA).

* * * * *